(12) United States Patent
Kraker

(10) Patent No.: US 7,544,317 B2
(45) Date of Patent: Jun. 9, 2009

(54) SYNTHETIC SOLID SURFACE MATERIAL AND METHOD

(76) Inventor: Patrick O. Kraker, 1800 Westminster Pl., Oklahoma City, OK (US) 73120

( * ) Notice: Subject to any disclaimer, the term of this patent is extended or adjusted under 35 U.S.C. 154(b) by 0 days.

(21) Appl. No.: 11/639,000

(22) Filed: Dec. 14, 2006

(65) Prior Publication Data

US 2007/0105981 A1    May 10, 2007

Related U.S. Application Data

(60) Continuation of application No. 10/744,727, filed on Dec. 23, 2003, now abandoned, which is a division of application No. 09/797,274, filed on Mar. 1, 2001, now Pat. No. 6,790,393, and a continuation-in-part of application No. 09/797,274.

(60) Provisional application No. 60/191,616, filed on Mar. 23, 2000.

(51) Int. Cl.
*B29C 39/02* (2006.01)
*B29C 39/12* (2006.01)
*B29C 71/02* (2006.01)

(52) U.S. Cl. .......................... 264/73; 264/162; 264/319; 264/331.21

(58) Field of Classification Search ................. 428/151, 428/322.2, 327, 328, 329; 427/262, 274
See application file for complete search history.

(56) References Cited

U.S. PATENT DOCUMENTS 3,816,155 A * 6/1974 Iverson et al. ................ 428/151
4,702,877 A * 10/1987 Davis, Jr. ..................... 264/553
5,055,324 A * 10/1991 Stecker ........................ 427/281

OTHER PUBLICATIONS

Akzo Nobel, Organic Peroxide Initiators for Curing Thermoset Resins, 2008, 20 pages.*

* cited by examiner

*Primary Examiner*—Robert Sellers
(74) *Attorney, Agent, or Firm*—Martin G. Ozinga; Phillips Murrah, P.C.

(57) ABSTRACT

A method and article of preparing a synthetic solid surface material having a simulated burled wood effect in a pattern therethrough comprising the steps of: preparing a matrix of isophthalic polyester resin, alumina trihydrate (ATH), iron oxide pigments and pearlescent mica pigments, mixing said matrix completely in a vessel, catalyzing said matrix with methyl ethyl ketone peroxide (MEKP) in said vessel, placing said vessel containing said matrix into a vacuum for removing any trapped air in said matrix, removing said matrix from said vacuum, preparing a burling effect material which comprises polyester resin, ATH, iron oxide pigments, and pearlescent mica pigments wherein said iron oxide and pearlescent pigments are chosen to simulate the color of the grain of a wood to be simulated and are generally a darker color than said matrix and said burling effect material has a specific gravity slightly less than the composition of said matrix, catalyzing said burling material with methyl ethyl ketone peroxide (MEKP), preparing a mixture of said burling effect material and said matrix by stirring said burling effect material into said matrix until a desired contrast occurs between said matrix and said burling effect material, pouring said mixture into a mold, curing said mixture into a hardened slab which comprises a top surface and a bottom surface wherein said bottom surface is in contact with said mold, and removing said slab from said mold.

11 Claims, 5 Drawing Sheets
(1 of 5 Drawing Sheet(s) Filed in Color)

SYNTHETIC SOLID SURFACE MATERIAL AND METHOD

CROSS-REFERENCE TO RELATED APPLICATIONS

The present application is a continuation of U.S. patent application Ser. No. 10/744,727, filed Dec. 23, 2003, abandoned, which is a divisional and continuation-in-part of U.S. patent application Ser. No. 09/797,274, filed Mar. 1, 2001, now U.S. Pat. No. 6,790,393 in which priority is claimed from U.S. provisional patent application Ser. No. 60/191,616 filed on Mar. 23, 2000. The entire content of each of the above-referenced applications is hereby expressly incorporated herein by reference.

BACKGROUND OF THE INVENTION

1. Field of the Invention

The present invention relates generally to synthetic solid surface materials with a simulated burled wood effect and a method of producing same. More particularly, the present invention is a synthetic solid surface material and method for producing the same with a finished appearance that resembles the color and grains of naturally occurring wood such as but not limited to pecan, maple, cherry wood, and other naturally occurring burled wood. It is further contemplated that the invention and method of obtaining the same may be used to produce solid surface materials that resemble stone and other unnaturally occurring material.

2. Prior Art

Wood has long been a fundamental element in every aspect of human life. Its strength, beauty, and versatility has furnished mankind with everything from fuel for campfires to building materials for homes. One of its most striking qualities is that no two natural pieces of wood can look exactly alike. Just as every tree is unique from every other tree, every board cut from a tree has a different grain than any other board from that same tree. Each piece of wood is unique in some fashion.

Its beauty and versatility is so highly prized that industry has tried to replicate these qualities for generations. Everywhere a natural wood appearance is desired, from desktops, picture frames, wall paneling, automobile interiors, and even automobile side panels, the prior art has attempted to provide a simulated wood which is cheaper or more durable than real wood.

One such example is a process utilizing a laminated sheet of printed wood grain under the trademark FORMICA. Such material is formed in large sheets and then cut and applied to the desired surface where a natural wood finish is wanted. Unfortunately, its appearance lacks the depth of natural wood. Another failure of laminating is the repeating pattern of grain caused by its printed properties. This repeating pattern problem is also a tell-tale sign that the product is a poor imitation of natural wood.

Another example of attempts to simulate a real wood appearance is the use of plastics. These too fall far short of the mark because plastic can not be polished like real wood when scratches or gouges occur, it lacks the durability of real wood when exposed to ultraviolet rays, and fails to capture the three dimensional beauty of a natural burled wood grain.

Still another problem in the prior art of the solid surface industry is creating unique non-recurring patterns such as are found in nature in massive quantities due to limitations of current production systems. Due to factors such as viscosity, thermodynamics, and continuous pouring methods associated with the materials used to form solid surfaces in bulk, the prior art has failed to provide the consuming industry and public with pleasing wood-like features in solid surfaces.

A further discussion of the prior art relating to decorative and ornamental protective coatings in simulation of wood graining, leather, and the like is found in Iverson et al. U.S. Pat. No. 3,816,155 issued Jun. 11, 1974 and U.S. Pat. No. 3,904,791 issued Sep. 9, 1975. Iverson et al. discloses a thin plastic coating for other materials, but in itself is not a durable product for use as a building material, for drilling into, threading into, sculpting, machining, routing, etc. Iverson et al. also uses ground metal for color contrasting which fails to provide a three dimensional aspect. Iverson et al. also requires a mechanical means of providing air into the material to create a burl-type effect by allowing the air bubbles to rise and collapse. The introduction of air creates a non-natural appearance in the material due to the fact that air is often trapped in the material and shows in the surface as a plastic looking air bubble not found in naturally occurring items like wood.

The prior art has been successful in making fairly realistic looking stone and marble synthetic solid surface materials. By adding a realistic veining effect that is seen in natural stone and marble, these products recreate the dimensional look required to make a simulated stone or marble look fairly natural. Such materials are commonly used in the manufacture of floor and other types of tiles, counter tops, sinks, architectural facings, ornamental objects, and generally for any other purpose that marble and stone are used. This veining technique which is fairly successful in stone and marble synthetic solid surfaces will not, however, duplicate a burled wood appearance for use in synthetic solid surface materials which attempt to simulate natural wood.

A further discussion of the prior art relating to veining for stone is found in Stecker U.S. Pat. No. 5,055,324 issued Oct. 8, 1991. The Stecker patent is directed to stone, marble, or the like which uses a blooming agent to create a veining effect. The Stecker patent, however, fails to disclose or produce a burled wood effect for simulating wood with such features as knots or growth rings.

Furthermore, geological formations and conditions frequently produce highly prized features in stone, which can not be recreated with veining techniques. These prior art veining techniques fail to capture the finer details of some naturally occurring stone which have layering details and a type of burling feature often found in desirable, more unique and natural stones which have wood-type appearance features.

It is also common that those in the solid surface industry are constantly trying to find novel and unique patterns for the solid surface consuming industry, which favor non-natural appearances. These patterns often attempt to create a look, which is distinguishable from naturally occurring material like wood and stone, but have highly pleasing aesthetic features, which draw from the fundamental looks of wood and stone.

As the world's supply of quality wood is diminishing, there is an ever increasing need for an alternative source to satisfy the demand that only natural wood can fulfill. Although many of the prior methods for creating synthetic surfaces simulating stone and marble have achieved a fairly realistic imitation to stone and marble, there has not been a realistic simulated burled wood synthetic solid surface, which has the advantages that synthetic solid surface materials provide until the current invention.

SUMMARY OF THE INVENTION

In general, the present invention is a synthetic solid surface material with a simulated burled wood effect which is formed by preparing a resin matrix with iron oxide pigments and pearlescent mica pigments, adding a darker mica pearlescent pigment and/or an iron oxide pigment composition with a slightly less specific gravity than the matrix for the creation of a burling effect, pouring or casting into a flat substrate in paths, and applying vibration or agitation which generally allows or speeds the darker pigment to rise and bubble to create a burling effect on the back side of the solid surface. The back side of the slab, the surface generally not in contact with the mold, is then sanded to the desired thickness on a wide belt sander.

It is also contemplated that the surface in contact with the mold may be utilized wherein patterns may be applied to the mold surface by using a contrasting or darker pigment in a criss-crossing manner. This pattern may generally produce an aesthetically pleasing "spider web" effect or pattern on the mold side which may be used as a finished product after sanding and so forth. A preferred embodiment generally comprises the steps of making a first batch of material, referred to as the pattern material, which is essentially used to form the criss-crossing pattern. A second batch of material, also referred to as the background material, is also prepared that will essentially form the background of the appearance. The pattern material and the background material should be visually differentiable. Generally, a preparation surface is provided and the pattern material is then poured or applied in a relatively thin fashion in a criss-crossing pattern. Next, the background material is then applied or poured over the pattern material. The resulting is then let harden and removed from the preparation surface. The side facing or in contact with the preparation surface is may then be sanded and cut to desire sizes.

In yet another preferred embodiment, a "lace" effect may be created by the above described wherein a first batch of material, referred to as the pattern material, is essentially used to form a layer, substrate or general cover of the mold. The aesthetically pleasing "lace" effect or pattern is generally created by the first batch of material rising through the second material and wherein the second material moves toward the mold surface.

It is also contemplated that the invention may be produced by a continuous pour method by varying the formulation to account for changes in such factors as but not limited to viscosity, gel time, and the like which also somewhat proportionally varies the burling effect mixture ratio to resin. It is further contemplated that the resins such as but not limited to polyester, acrylic, and epoxy may be utilized.

In this respect, before explaining at least one embodiment of the invention in detail, it is to be understood that the invention is not limited in this application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, an object of the present invention to provide a new and improved synthetic solid surface material with a simulated burled wood effect and method for producing same, which has the visual characteristics of natural wood.

It is a further object of the present invention to provide a new and improved synthetic solid surface material with a simulated burled wood effect, which may be easily and efficiently manufactured and marketed.

An even further object of the present invention is to provide a new and improved synthetic solid surface material with a simulated burled wood effect and method for producing same which is of a more durable and reliable construction than that of natural wood.

Still another object of the present invention is to provide a new and improved synthetic solid surface material with a simulated burled wood effect and method for producing the same which is susceptible of a low cost of manufacture with regard to both materials and labor, which accordingly is then susceptible of low prices of sale to the consuming public, thereby making such economically available to the buying public.

Another object of the present invention is to provide a new and improved synthetic solid surface material with a simulated burled wood effect and method for producing same which provides some of the advantages of the prior art, while simultaneously overcoming some of the disadvantages normally associated therewith.

Yet another object of the present invention is to provide a new and improved synthetic solid surface material with a simulated burled wood effect and method for producing the same which is resistant to fire, fading which is normally associated with exposure to sunlight, watermarks, stains, dry-rot, insects such as termites or carpenter ants, and splitting which is normally associated with age and dryness.

Still yet, another object of the present invention is to provide a new and improved synthetic solid surface material and method for producing the same with a stone appearance that features visual elements often found in naturally occurring wood.

It is a further object of the present invention to provide a new and improved synthetic solid surface material and method for producing the same, which satisfy the consuming industry's desire for novel and unique patterns of non-natural appearing solid surface materials.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference would be had to the accompanying drawings and descriptive matter in which there is illustrated preferred embodiments of the invention.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

DETAILED DESCRIPTION OF THE PREFERRED EMBODIMENTS

In general, the present invention is a synthetic solid surface material with a simulated burled wood effect and method for producing the same. A key ingredient in the invention is the addition of pearlescent pigments to simulate wood color and a darker or different pearlescent pigment for the burling grain effect. The burling effect can also be achieved with iron oxide pigments without the addition of pearlescent pigments. The burling effect gives the solid surface material lines such as would be found in the growth rings, grains, or layers, as well as a bubbled, circled or mottled appearance often found in cut wood.

It is understood that the invention produces non-repeating patterns in the synthetic solid surface material and from batch of material to batch. Although the patterned synthetic solid surface material will vary to a certain degree, the invention produces consistent similarities found in naturally occurring items with burled wood features. It is also understood that the features described below may vary and the references to these features are for illustrative purposes and are not to be considered limiting.

Figure 1:
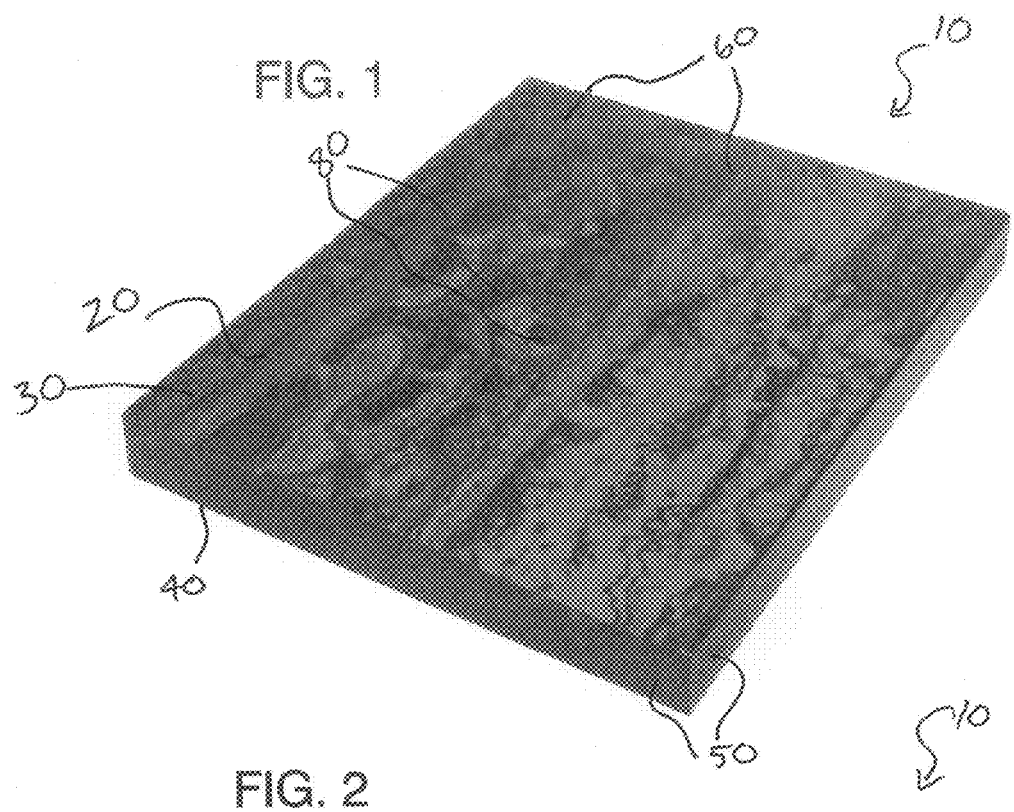

For purposes of illustration, FIG. 1 is a perspective view of a preferred embodiment of a synthetic solid surface material 10 with a preferred simulated burled wood effect 20. The invention as depicted in the embodiment has a top surface 30, a bottom surface 40 which is generally the surface in contact with a mold when being produced which is discussed in greater detail below, and side surfaces 50 which generally depict the spread of the burling effect 20 between the top surface 30 and the bottom surface 40.

Figure 2:
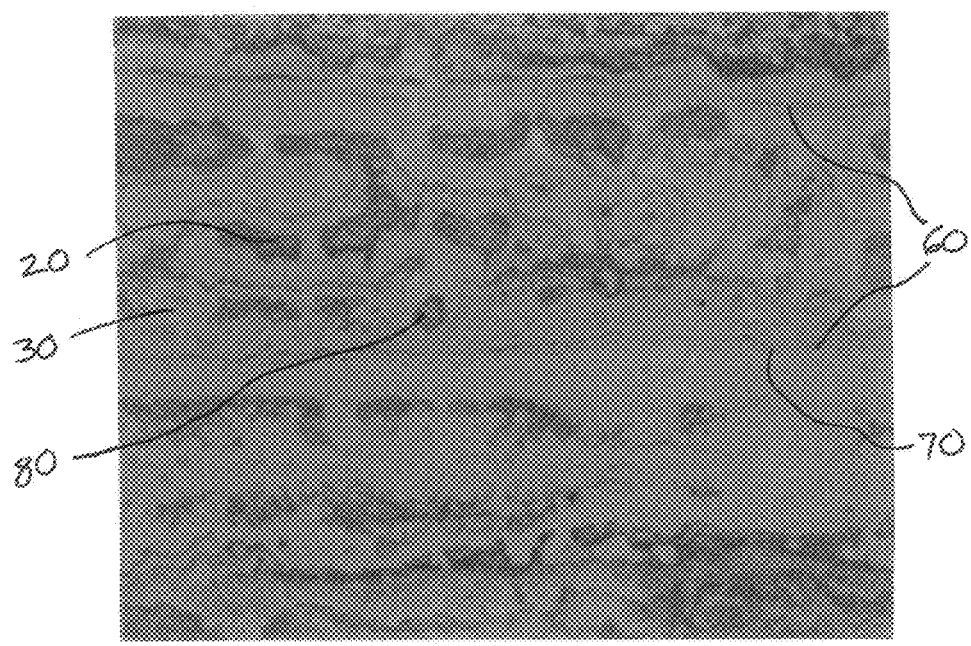

Again referring to the illustrations and FIG. 2 in particular, reference character 60 generally depicts the growth rings and grains often found in cut wood for a simulated burled wood effect 20. Reference character 70 generally depicts a pour line, which will also be discussed in greater detail below. Reference character 80 generally depicts the bubbled, circled or mottled appearance often found in cut wood for a simulated burled wood effect 20.

Pearlescent pigments exhibit the same visual effect as a natural pearl and give the invention a dimensional quality. These pigments are made of many thin transparent platelets of high refractive index oriented to reflect and transmit light simultaneously. As with a pearl, the multiple reflections/transmissions of light prevent the eye from focusing on any single platelet. This gives a sense of pearl-like depth. The first pearlescent pigments were derived from thin crystals attached to the scales of fish, such as herring. Due to the high cost associated with natural pearlescent pigment, synthetic versions have been developed. In a preferred embodiment, pearlescent pigments made out of mica (potassium aluminum silicate) coated with either titanium dioxide, iron oxide, or the like is used.

In a preferred method, a matrix of isophthalic polyester resin, alumina trihydrate (ATH), iron oxide pigments, and pearlescent mica pigments are mixed in a mixing vessel or pot. The iron oxide and pearlescent pigments are chosen to achieve the desired color of wood to be simulated. The composition is mixed completely and catalyzed with about 2% by weight methyl ethyl ketone peroxide (MEKP).

The vessel containing the matrix is then put into a vacuum for removing any trapped air in the matrix. A preferred embodiment is placing the matrix in the vacuum for about 6 min. After the matrix is removed from the vacuum, burling material is then added into the matrix for the creation of the burling effect in the finished product.

A preferred embodiment of the burling effect material is prepared from polyester resin, ATH, iron oxide pigments, and pearlescent mica pigments. Another preferred embodiment of the burling effect material uses iron oxide pigments and not pearlescent. The iron oxide and pearlescent pigments are chosen to simulate the color of the grain of the wood to be simulated and is generally a darker color than the matrix. The burling effect material also is preferred to have a specific gravity slightly less than the composition of the matrix. It is also contemplated that a higher specific gravity may be utilized in a lower viscosity matrix, depending on which side of the final product is preferred.

The burling effect material is catalyzed with MEKP and mixed into the matrix by stirring. The burling effect material is then added to the pre-existing matrix and stirred to achieve the desired contrast between the general color of the wood to be imitated and the burling grain. It is undesirable to mix the two to the point where a single homogeneous color occurs.

The new mixture is then panned into about a ⅝" thickness in a generally flat mold. The thickness of the pour can be as little as about ¼" or as thick as several inches. Another preferred embodiment is pouring the mixture to about 3". To be noted, some thickness of the final product is lost during the finishing process which will be described in more detail below.

Another key to the invention is the pouring of the mixture in paths so as to create the appearance of naturally occurring rings in the grain of wood. The mixture is cast in generally straight parallel lines on the mold. A preferred embodiment is an 8" path, but greater or smaller paths are contemplated depending on the desired grain effect.

After pouring into the mold, the mold is vibrated to agitate the mixture. Agitation is known in the prior art to level and distribute the mixture in the mold. In the present invention, agitation also allows or speeds the burling effect to occur in thicker matrix by letting the burling material rise and "bubble up" in circular patterns in the matrix. This produces a more knotted and burled appearance on the portion of the mixture which is not in contact with the mold, otherwise known as the back side of the material. The vibrator also helps remove to the back side any air which was mixed into the matrix when the burling effect is added. It is also contemplated that thinner matrixes may not require a vibration for the burling effect to occur.

After the material has cured at room temperature, the slab is post-cured at temperatures of approximately 150°-180° Fahrenheit for about 1 to 2 hours. The slab is then sanded to the desired thickness on a wide belt sander using the back side as the finished side. It is not uncommon to sand away at least about ⅛" or more of the product to achieve the desired finish.

EXAMPLES

The following examples further illustrate embodiments of the present invention including preferred versions and methods of making the same; however, these examples are not to be construed as limitations of this invention. The following examples are defined as parts and percentages by weight unless otherwise indicated and introduce a change in the examples from percent to parts by weight.

Example 1

In a preferred embodiment of the invention, synthetic solid surfaces with a simulated burled wood finish resembling a pecan, maple, or the like wood finish are generally produced by making a matrix with about 42% resin of about but not limited to 1750-1800 centipoise (CPS), about 54% ATH filler such as but not limited to SOLUM O.E. 255, about 3% pearlescent gold pigment such as but not limited to INCA GOLD sold by MEARLIN, about 1% pearlescent bronze pigment such as but not limited to SUPER BRONZE sold by MEARLIN and 1 gram per pound of burnt umber brown iron oxide pigment.

The burling effect is generally produced with about 45% resin, about 54% ATH, and about 1% to 2% of iron oxide pigments. A preferred embodiment of the about 1% to 2% iron oxide pigment is a mixture of about three different iron oxide pigments comprising about 25 grams per pound of matrix black iron oxide pigment, about 30 grams per pound of matrix of raw umber iron oxide pigment, about 15 grams per pound of matrix of red iron oxide pigment.

Example 2

In another preferred embodiment of the invention, synthetic solid surfaces with a simulated burled wood finish resembling a pecan, maple, or the like wood finish are generally produced by making a matrix with polyester casting resin approximately 1750-1800 CPS 42 to 48%, ATH filler such as but not limited to SOLUM O.E. 255 of about 47 to 53%, pearlescent gold pigment about 3%, pearlescent bronze pigment about 1%, burnt umber iron oxide pigment about 1 gram per pound of matrix, and air release of about approximately 1%.

The burling effect material can be made from the above matrix. The burling effect in this preferred embodiment is produced with three distinct burling compositions: black burl—volume per total weight of matrix approximately 5% adding iron oxide black 5 to 7% of burling material weight, raw umber burl—volume per total weight of matrix approximately 6% adding raw umber oxide pigment 5 to 7%, and red oxide burl—volume per total weight of matrix approximately 3% adding red oxide pigment 5 to 7%.

Example 3

In still another preferred embodiment of the invention, synthetic solid surfaces with a simulated burled wood finish resembling cherry wood or the like finish is generally produced by making a matrix with about 42% resin of about but not limited to 1750-1800 CPS, about 54% ATH filler such as but not limited to SOLUM O.E. 255, about 3% pearlescent copper pigment such as but not limited to SUPER COPPER sold by MEARLIN, about 1% pearlescent gold pigment such as but not limited to INCA GOLD sold by MEARLIN and 2 grams per pound of red iron oxide pigment.

The burling effect is generally produced with about 45% resin, about 54% ATH, and about 1% to 2% of iron oxide pigments. A preferred embodiment of the about 1% to 2% iron oxide pigment is about 25 to 40 grams per pound of matrix black iron oxide pigment.

Furthermore, it will be found that a similar burled pattern can be produced in other resins and formulations, acrylics, epoxies, and most thermoset plasters in combination with fillers such as silica, marble dust (calcium carbonate), ATH, and the like.

It will also be found that the burling effect material may be modified to work in lower viscosities, such as 1000 CPS, to high viscosities. Proportionately less ATH filler will demand a greater volume of burling effect material and also a greater strength or distinctiveness of material.

Higher viscosities of matrix using higher CPS resins and greater filler loading will use less burling material volume and less strength of pigment. The burling effect package can be designed to produce a greater effect on the down side of the cast part, or mold sides by increasing the strength or specific gravity of the burling material as well as the volume.

If the back side of the cast part is to be the final finished side with the desired greatest burled effect on the back side, a lessened specific gravity in the burling material will be necessary and somewhat less strength of the pigment will produce the desired effect.

It is contemplated that varying the resin system, such as but not limited to acrylic, epoxy, or polyester with different viscosity produced by different systems (acrylic, epoxy, polyester etc.), a similar burled pattern can be produced in both casts, on the mold side or the back side. The specific gravity of the burling material can easily be increased or decreased by the adding of resin or styrene, etc. or increased by the increasing of filler or pigments.

The volume of burling material can be as little as about 5% to over 40%. The strength of burling material can vary from about 1% to 10%. The temperature of the cast material can also affect the pattern in the cast product. In a preferred embodiment, polyester cast works well with matrix temperature from 80° to 85° Fahrenheit.

Gel times also effect the pattern formation. The pattern forms very quickly after the introduction of the burling material into the matrix. A quick gel time under 3 minutes may give a good tight burled effect with sharp color difference. A longer gel time of 5 to 8 minutes will allow the pattern to soften and become less distinct. Control of the gel time is a consideration in producing a constant appearance, color, and pattern with continuity.

The cast material can be cast onto any number of mold configurations, simple open sheet molds with a preferred shape or thickness. In a preferred embodiment, the desired thickness for certain length and width casts is preferably a thickness of around ¼" to 1" thick. It is also contemplated that unique shapes which incorporate curves such as bowls may be used.

Whereas, the examples illustrated above will produce non-uniform burled wood color effects on solid surface materials which could be cast into a fixed shape or a open stationary slab mold with fixed dimension of length and width, it is also desirable to manufacture the above referenced material on a continuous casting belt arrangement where the material is continuously poured onto belt for mass production. The poured material is preferably allowed to cure on the belt in a continuous process. For such, different resins may be used for their physical properties which may be more conducive to a quicker pour for covering said belt as it moves at fixed rates. It is therefore contemplated that resins other than isophthalic polyester resin may be used where the polyester formulations as in the above examples may not have a proper viscosity to achieve the desired results on a continuous belt system.

In order to facilitate casting on a continuous pouring line, matrix viscosity may have to be reduced to allow quick flow and spread of the material on the moving belt. Reducing the viscosity of the casting will greatly affect the burling effect in the cast product and therefore requires a modified formulation.

Example 4

In another preferred embodiment of the invention, synthetic solid surfaces with a simulated burled wood finish resembling a pecan, maple or the like wood finish are generally produced by making a matrix of polyester casting resin of 1750 to 1800 CPS of about 42 to 48%, ATH filler such as but not limited to SOLUM O.E. 255 of about 47 to 53%, pearlescent copper pigment of about 3%, pearlescent gold pigment of about 1%, and air release of approximately 1%.

The burling effect material in this preferred embodiment uses one color for the burled effect being black with a volume per total weight of matrix of approximately 10% plus black iron oxide pigment 5 to 6% of burling effect material weight. It is also contemplated the black burling effect material could be 5 to 7% volume per total matrix weight with added black iron oxide pigment of about 5 to 6%.

It may be necessary to alter the viscosity of the burling material to compliment the various matrix viscosities. It is contemplated that the use of ATH of about 2 to 10% will increase the specific gravity and the use of styrene of about 1 to 5% will decrease the specific gravity. A lower viscosity matrix will require a little thicker burling material, whereas a thicker cast matrix will use a thinner burling material to produce a similar burled effect.

Example 5

In another preferred embodiment of the invention, synthetic solid surfaces with a simulated burled wood finish resembling cherry wood or the like finish is generally produced by the following polyester formulation for a continuous pouring belt system. It is also contemplated that other non-natural and stone appearance could be made with said formulation for a continuous pour application.

Making a matrix with about 50% polyester casting resin such as but not limited to 1700 to 1800 CPS, about 38% ATH filler such as but not limited to SOLUM #431, about 3% pearlescent copper pigment such as but not limited to SUPER COPPER sold by MEARLIN, about 1% pearlescent gold pigment such as but not limited to INCA GOLD sold by MEARLIN, about ½% red oxide pigment, about 5 to 8% styrene, about 1% air release such as but not limited to BERGER #340, and about ¼% wetting agent, such as but not limited to BERGAWET 3000.

A preferred embodiment of burl formulation is approximately 8% to 10% of total weight from the above matrix by adding 10% to 15% black iron oxide pigment.

It is also contemplated that another preferred embodiment of the invention may use thermoset acrylic resin formulations for casting in a continuous belt system. It is understood that the matrix viscosity of the above formulation is more similar to a preferred acrylic viscosity and with minor modification of the formulas should produce a similar burled wood effect. Some consideration for modifications of the above examples are discussed below.

A quick gel time of the resin system used is important. From the time the burling material is introduced into the matrix, the matrix should begin to set within minutes (1 to 4 min. or less). Too long of a gel time will cause the burling pattern to diffuse into the matrix and loose the desired pattern.

If the manufacturer, in the casting process wishes to use the back side of the casting as the finished side, a slight reduction of the specific gravity of the burling material is desirable. Examples 1 and 2 will produce a burled look on both sides of the cast product but the back side will be more pronounced. A preferred method of further reducing the viscosity is the addition of resin or styrene from 2 to 10% of the burling material, depending on the desired burled effect.

If the downside of the cast product is the desired finish side, increase the specific gravity of the burling material by adding ATH, iron oxide pigment or both 1% to 5% over the formula.

Manufacturers using continuous, automated casting systems will be familiar with their methods of injecting the burling effect material into the matrix and depositing said material on the moving belt. By making minor adjustments to the burling package formulation, be they polyester or acrylic, by changing viscosity and/or specific gravity of the vein, a desirable wood look is possible.

Example 6

Figure 3:
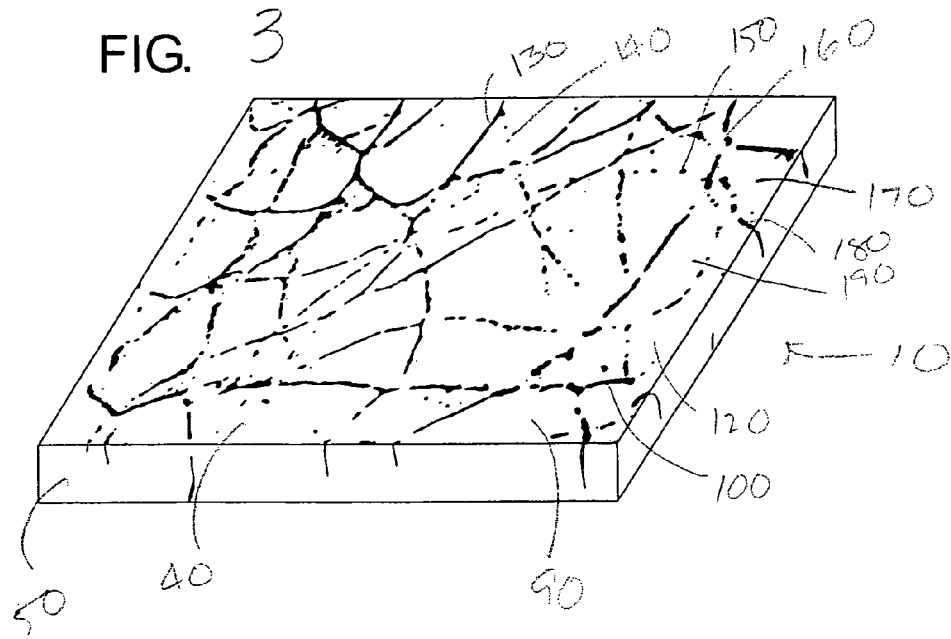
FIG. 3 is a perspective view of a bottom or mold side of a synthetic solid surface with a so called simulated spider web effect constructed in accordance with the present invention.

Incorporating and expounding on the previously above discussed, in another preferred embodiment, the down side, cast side, or bottom surface may be utilized for an aesthetically pleasing product. Another preferred embodiment synthetic solid surface material 10 or product with pleasing aesthetic features and method for producing the same is generally depicted in FIG. 3. Reference character 90 generally refers to a solid surface material 10 having a spider web effect 100 on the down side, cast side, or bottom surface 120. In this preferred embodiment, the finished surface 110 would be the down side, cast side, or bottom surface 40 of the solid surface material 10 wherein the spider web effect 100 is created.

Figure 4:
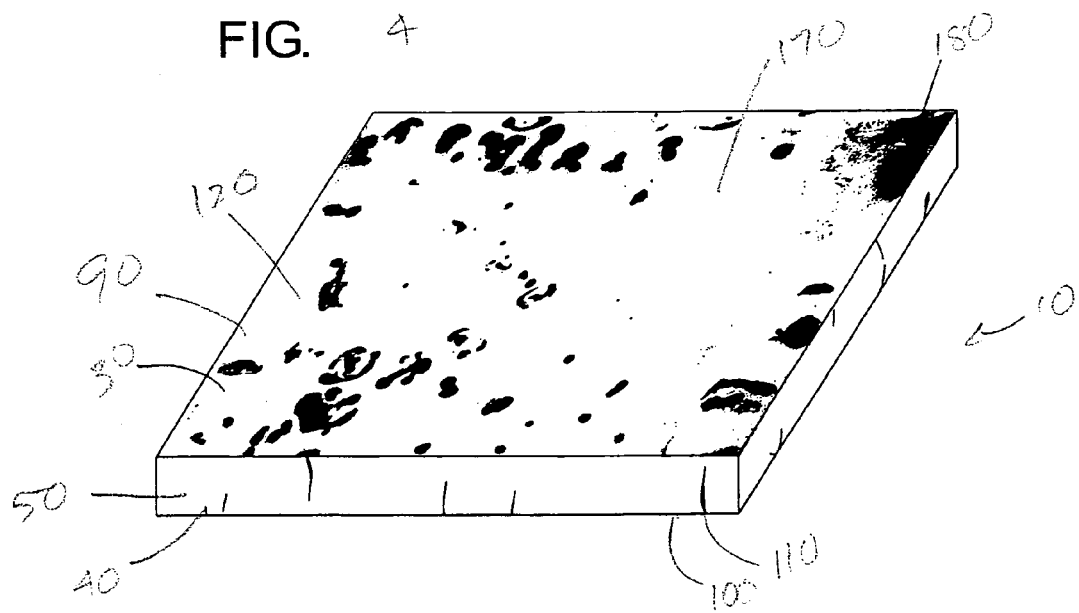
FIG. 4 is a perspective view of a top side or unfinished surface of a synthetic solid surface with a so called simulated spider web effect constructed in accordance with the present invention.
Figure 5:
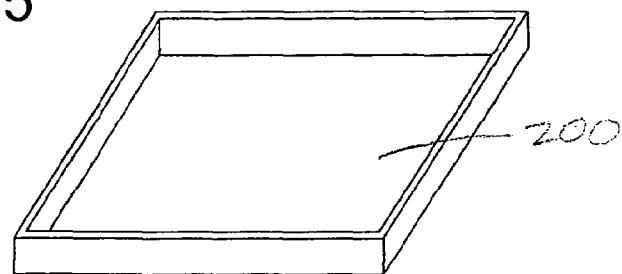
FIG. 5 is an illustration of a preferred embodiment of a mold.

For purposes of illustration, FIG. 3 is a perspective view of a preferred embodiment of a synthetic solid surface material 10 or product with a preferred simulated so called spider web effect 100, feature, pattern or design hereinafter referred to as spider web effect 100, generally depicting the finished surface 110. Once again referring to the drawings and in particular FIG. 4, solid surface material 10 is the same embodiment shown in FIG. 3 but depicting the referenced top surface 30, non-finished or non-cast side surface. In this preferred embodiment, unfinished surface 120 is the non-used and non-aesthetic side. The solid surface material 10 as depicted in FIGS. 3 and 4 also generally depicts the side surfaces 50 with it understood that FIG. 3 and FIG. 4 shows the side surfaces 50 generally flipped.

For purposes of further illustration, spider web pattern 100 generally comprises lines 130, partially lines 140 and dots 150 wherein intersections 160 are generally created that may simulate a spider's web. Spider web pattern 100 is generally referred to as a simulated spider web effect due to the visual representation and should not be considered limiting.

It is also understood that the invention produces essentially non-repeating patterns in solid surface material or product 10. And although spider web pattern 100 will vary to a certain degree, the invention 10 produces consistent similarities to a so called simulated spider web effect, feature, pattern or design. It is also understood that the features described previously may vary and the references to these features are for illustrative purposes and are also not to be considered limiting.

In a preferred embodiment, two materials, a first material generally referred to as background material 170 and a second material, generally referred to as pattern material 180 are prepared separately. It is understood that invention 10 may comprise more than two materials for other pleasing aesthetic features with different patterns and colors that still have an overall spider web pattern 100. Generally, pattern material 180 forms spider web pattern 100 and background material 170 forms a background 190 to spider web pattern 100 which will be discussed in greater detail below.

It is further understood that background material 170 and pattern material 180 may be of any variety of colors such that there is a visually differentiable contrast in color between background material 170 and pattern material 180. In a preferred embodiment, background material 170 may be generally lighter in color or appearance such as but not limited to white or off white while pattern material 180 is darker in color or appearance such as but not limited to black or grey. It is further understood that background material 170 may be the darker color or appearance and the pattern material 180 may be the lighter color or appearance. Still furthermore, it is understood that both background material 170 and pattern material 180 may be the same general color but yet still visually differentiable.

The following examples further illustrate embodiments of the present invention including preferred versions and methods of making the same, however, these examples are not to be construed as limitations of this invention. The following examples are defined as parts and percentages by weight unless otherwise indicated and introduce a change in the examples from percent to parts by weight.

In a preferred embodiment, background material 170 generally comprises:

38% to 50% polyester resin,
38% to 50% ATH filler,
1% to 2% iron oxide pigments, and
2% MEKP organic peroxide type D.

The aforementioned are blended and then processed to remove or reduce air bubbles that may have occurred in the blending process. In a preferred method, the resin, alumina trihydrate (ATH), iron oxide pigments are mixed in a mixing vessel or pot. It is understood that the iron oxide pigment is generally used to provide some color to background material 170 and that it may vary to a greater and lesser extent depending on the desired color and relative strength or quantity of color. It is also further understood that particulates, such as but not limited to mica may be added as well as other coloring and pattern techniques known in the art.

The composition is mixed completely and catalyzed with about 2% by weight methyl ethyl ketone peroxide (MEKP). The vessel containing the background material 170 is then put into a vacuum for removing any trapped air. In general, the vacuum process allows trapped air in the mix to expand and rise to the top of the mixture. It is understood that the vacuum or air removal process may not be needed or desired. A preferred embodiment is placing the now mixed background material 170 in the vacuum for about 6 min.

Furthermore, it is contemplated that air removal may be accomplished by placing the mixture in a pressure vessel which, under pressure, condenses existing trapped air bubbles so that they are non-visible or nearly non-visible. It is also contemplated that the vacuum method may include a vacuum mixer where the mixture is mechanically blended while under a vacuum or placed in a vacuum where no mechanical mixing occurs.

In a preferred embodiment, pattern material 180 generally comprises:

90% to 95% polyester resin,
1% to 2% silica thixotropic,
2% to 5% ATH filler,
1% to 2% catalyst MEKP,
1% to 2% pigment.

The aforementioned are blended and then processed to remove or reduce air bubbles that may have occurred in the blending process. In a preferred method, the resin, alumina trihydrate (ATH), iron oxide pigments are mixed in a mixing vessel or pot. The composition is mixed completely and catalyzed with about 2% by weight methyl ethyl ketone peroxide (MEKP). It is contemplated in a preferred embodiment that the now mixed pattern material 180 is not subjected to an air removal process as generally described above. It is also understood that another preferred embodiment may subject the now mixed pattern material 180 to a process of air removal.

It is understood that the differences in specific gravity between the background material 170 and pattern material 180 allows the pattern material 180 to rise through the background material 170. Furthermore, it is understood that elements of the background material may migrate to the bottom surface 40.

In a preferred method, the resin is isophthalic polyester resin but not limited to such.

Also in a preferred method, the resin in both the pattern material 180 and background material 170 is isophthalic polyester resin but not limited to such. It is further contemplated that other resins and formulations, acrylics, epoxies, and most thermoset plasters by themselves and in combination with fillers such as silica, marble dust (calcium carbonate), ATH, and the like may be used.

As generally depicted in FIGS. 5-8, in a preferred embodiment, the pattern material 180 is applied to a preparation surface 200. Preparation surface 200 may be a mold but not limited to such. It is understood that the preparation surface 200 should be generally inert such that neither the pattern material 180 nor the later added background material 170 interact, stick, or otherwise adhere to the preparation surface 200. Preparation surface 200 may be wax based, glass, melon, metal or other suitable material common with use in the industry.

Figure 6:
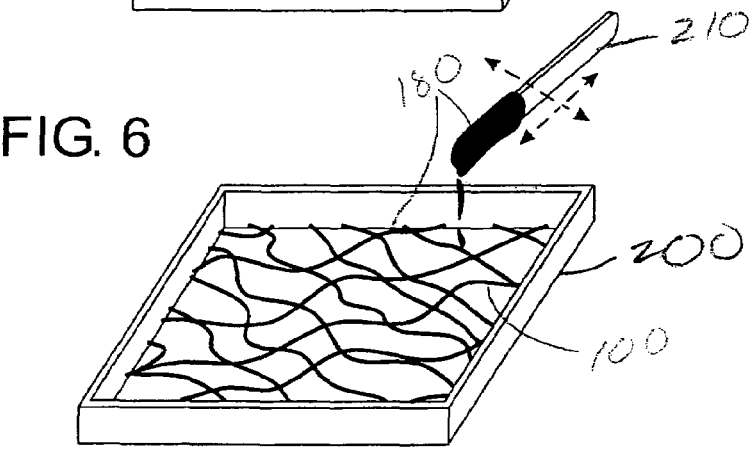
FIG. 6 is a perspective top view of a preferred method or step of applying a pattern material to a mold in accordance with the present invention.

Once again referring to the drawings and in particular FIG. 6, pattern material 180 is then generally applied in a desired fashion on preparation surface 200 such that lines 130, partial lines 140 and dots 150 are created with intersections 160. In a preferred embodiment, an applicator 210 is dipped into the pattern material 180, much like a paint brush is dipped into paint by example, and then the applicator is 210 is generally applied or drizzled across the preparation surface 200 depositing pattern material 180 in a generally thin manner wherein lines 130, partial lines 140 and dots 150 are created in with intersections 160 forming the desired spider web pattern 100. The application of pattern material 180 may be as thin as 5 mils or as thick as 50 mils. It is understood that the application may be thinner or thicker than the aforementioned and the invention should not be limited as such.

It is also further contemplate that pattern material 180 may be applied by other means such as individual jets or nozzles (not depicted) wherein pattern material 180 is dripped by a plurality of nozzles in one direction across the preparation surface 200 forming lines 130, partial lines 140 and dots 150. The nozzles change direction (or use a second plurality of nozzles) and apply a second layer of pattern material 170 creating lines 130, partial lines 140 and dots 150 wherein intersections 160 are generally formed such that a general spider web pattern 100 is achieved.

Figure 7:
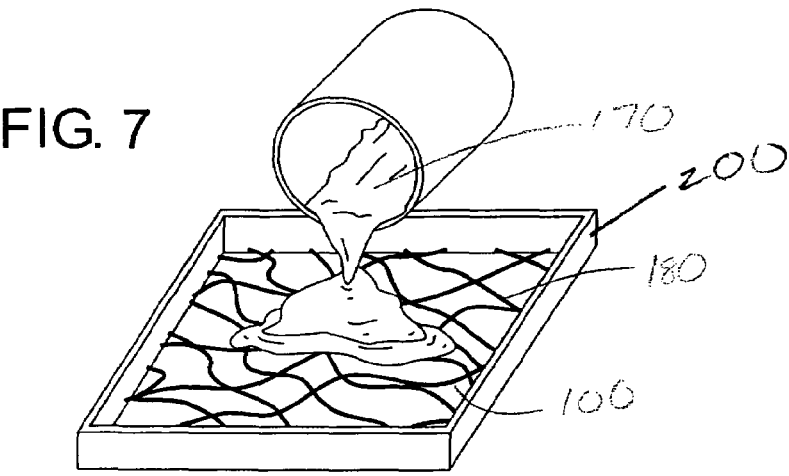
FIG. 7 is a perspective top view of a preferred method or step of applying a background material in accordance with the present invention.

Generally referring to FIG. 7, after the desired spider web pattern 100 is created on preparation surface 200, in a preferred embodiment, the background material 170 is then applied, poured, or deposited forming a slab 230. Background material 170 should be applied such that pattern material 180 is covered and to the generally desired thickness for finished solid surface material or product 10. It is understood that some thickness may be lost if the formed slab 230 is sanded which is previously discussed in greater detail. In a preferred construction, slab 230 may be cast onto any number of mold configurations, simple open sheet molds with a preferred shape or thickness. In a preferred embodiment, the desired thickness for certain length and width casts is preferably a thickness of around ¼ inch to 1 inch thick. It is also contemplated that unique shapes which incorporate curves such as bowls may be used. It is understood that the invention should not be limited to a specific thickness and the aforementioned are for purposes of examples of a preferred construction.

Figure 8:
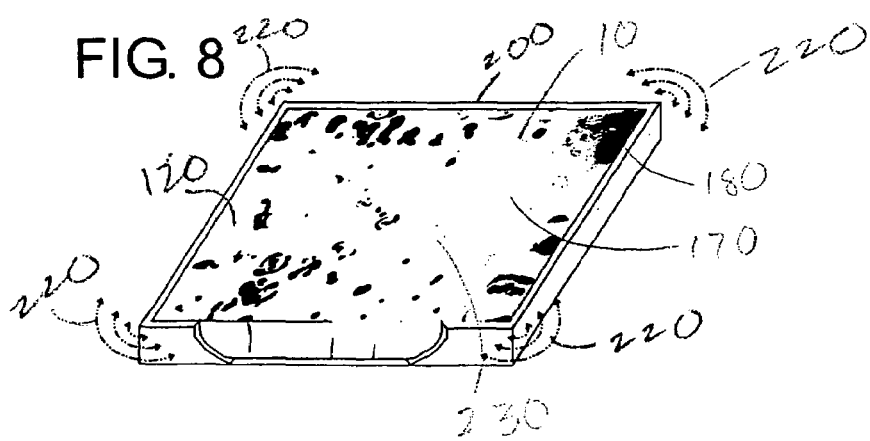
FIG. 8 is a perspective top view of a preferred method or step of agitating in accordance with the present invention.

Referring generally to FIG. 8, in a preferred embodiment, the slab 230 is vibrated to agitate the mixture of the pattern material 180 and background material 170. Agitation, generally depicted by reference numeral 220, is known in the prior art to level and distribute the contents in the mold or preparation surface 200. In a preferred embodiment, agitation also allows or speeds the pattern effect to occur in thicker matrix by letting the pattern material 180 to rise and "bubble up". The vibrator also helps remove to the top surface 30, also known as the back side, any air which was mixed into the matrix when the pattern material 180 or background material 170 is added. It is also contemplated that thinner matrixes may not require a vibration.

Example 7

Figure 9:
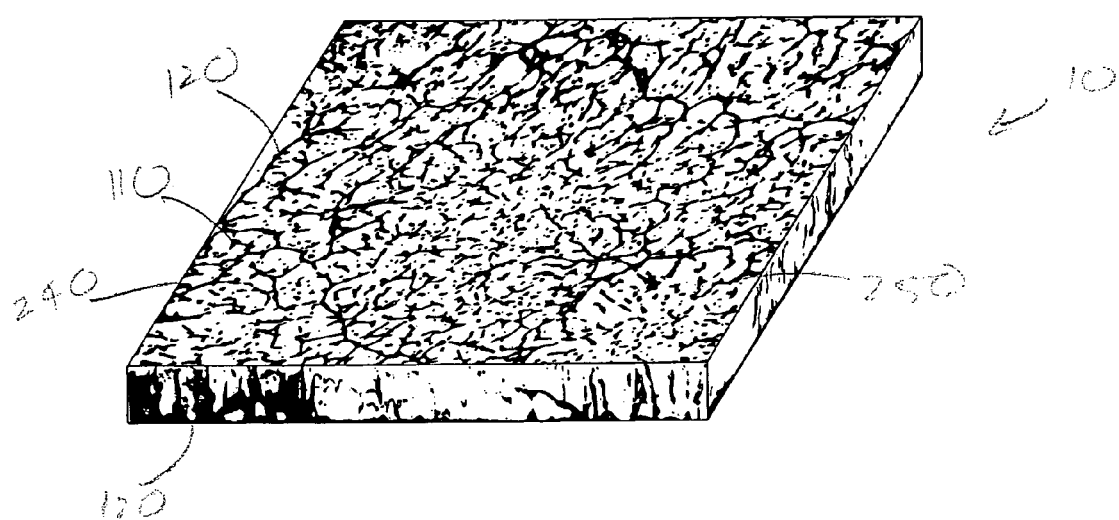
FIG. 9 is a perspective view of a bottom or mold side of a synthetic solid surface with a so called simulated lace effect constructed in accordance with the present invention.

Further incorporating and expounding on the previously above discussed, in another preferred embodiment as generally described in Example 6, the down side, cast side, or bottom surface may be utilized for another aesthetically pleasing product. Another preferred embodiment synthetic solid surface material 10 or product with pleasing aesthetic features and method for producing the same is generally depicted in FIG. 9. Reference character 240 generally refers to a solid surface material 10 having a lace pattern effect 100 on the down side, cast side, or bottom surface 120. In this preferred embodiment, the finished surface 110 would be the down side, cast side, or bottom surface 40 of the solid surface material 10 wherein the lace patterns effect 240 is created.

Figure 10:
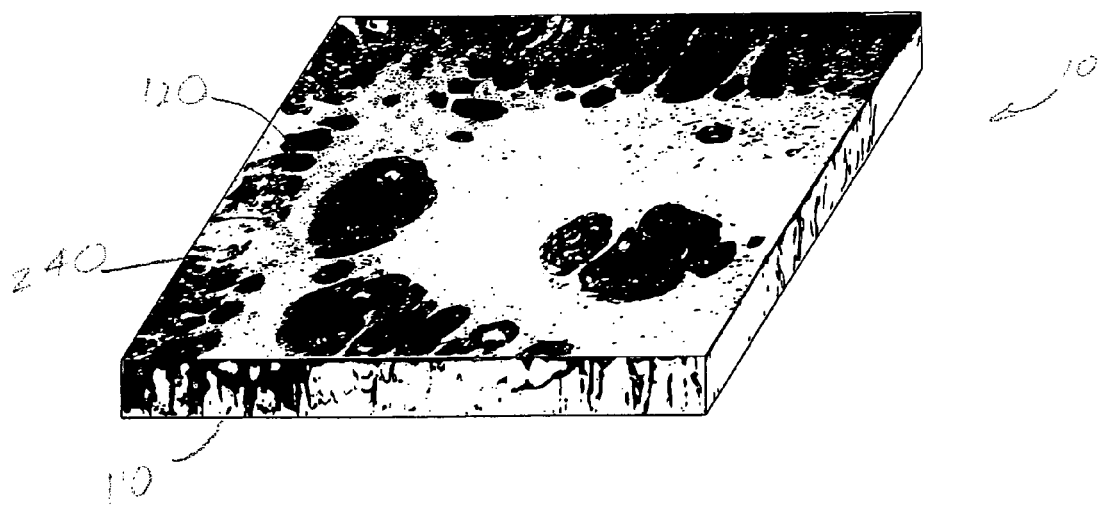
FIG. 10 is a perspective view of a top side or unfinished surface of a synthetic solid surface with a so called lace web effect constructed in accordance with the present invention.
Figure 11:
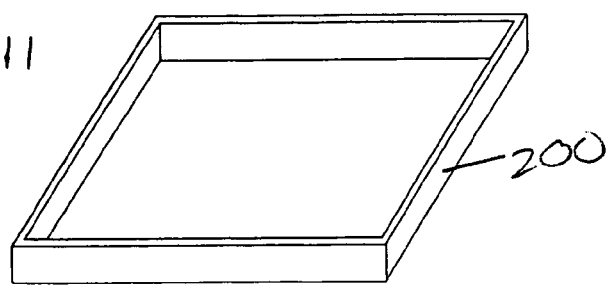
FIG. 11 is an illustration of a preferred embodiment of a mold.
Figure 12:
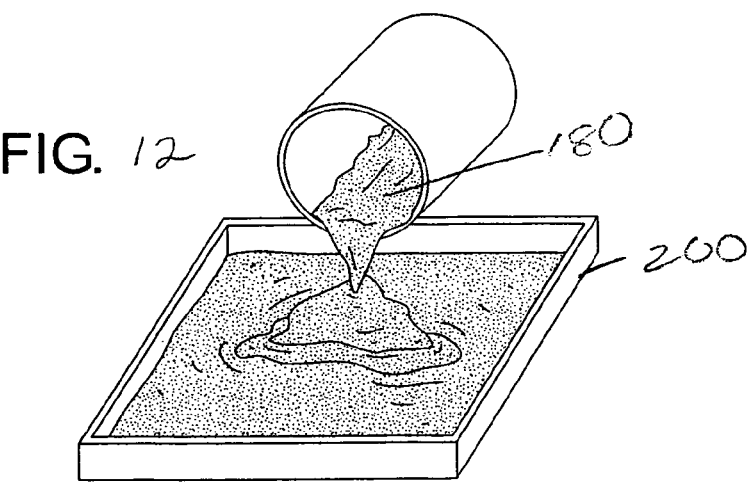
FIG. 12 is a perspective top view of a preferred method or step of applying a pattern material to a mold in accordance with the present invention.

For purposes of illustration, FIG. 9 is a perspective view of a preferred embodiment of a synthetic solid surface material 10 or product with a preferred simulated so called lace pattern effect 100, feature, pattern or design hereinafter referred to as lace pattern effect 240, generally depicting the finished surface 250. Once again referring to the drawings and in particular FIG. 10, solid surface material 10 is the same embodiment shown in FIG. 9 but depicting the referenced top surface 30, non-finished or non-cast side surface. In this preferred embodiment, unfinished surface 120 is the non-used and non-aesthetic side. The solid surface material 10 as depicted in FIGS. 9 and 10 also generally depicts the side surfaces 50 with it understood that FIG. 9 and FIG. 10 shows the side surfaces 50 generally flipped.

As generally depicted in FIGS. 11-14, in a preferred embodiment, the pattern material 180 is applied to a preparation surface 200 as generally discussed above. Once again referring to the drawings and in particular FIG. 12, pattern material 180 is then generally applied in a desired fashion on preparation surface 200 such that most or all of the entire preparation surface 200 is generally covered by pattern material 180. The application of pattern material 180 may be as thin as 5 mils or as thick as 50 mils. It is understood that the application may be thinner or thicker than the aforementioned and the invention should not be limited as such.

Figure 13:
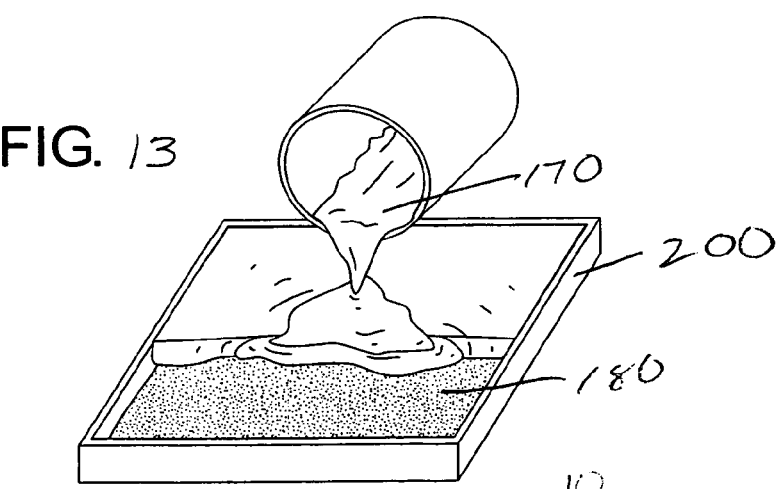
FIG. 13 is a perspective top view of a preferred method or step of applying a background material in accordance with the present invention.

Referring now generally to FIG. 13, in a preferred embodiment, the background material 170 is then poured, placed, or the like onto the pattern material 180 such that most or all of the pattern material 180 is covered. Background material 170 should be applied such that pattern material 180 is covered and to the generally desired thickness for finished solid surface material or product 10. It is understood that some thickness may be lost if the formed slab 230 is sanded which is previously discussed in greater detail.

Figure 14:
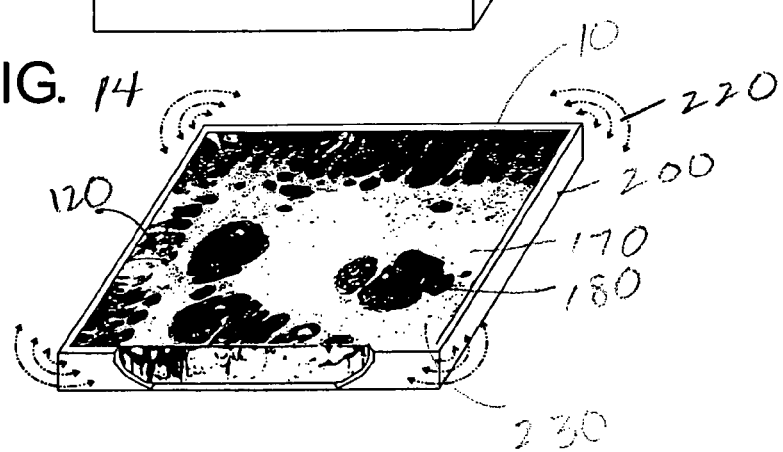
FIG. 14 is a perspective top view of a preferred method or step of agitating in accordance with the present invention.

Referring generally to FIG. 14, in a preferred embodiment, the slab 230 is vibrated to agitate the mixture of the pattern material 180 and background material 170. Agitation, generally depicted by reference numeral 220, is known in the prior art to level and distribute the contents in the mold or preparation surface 200. And as discussed previously, in a preferred embodiment, agitation also allows or speeds the pattern effect to occur in thicker matrix by letting the pattern material 180 to rise and "bubble up". The vibrator also helps remove to the top surface 30, also known as the back side, any air which was mixed into the matrix when the pattern material 180 or background material 170 is added. It is also contemplated that thinner matrixes may not require a vibration.

It is contemplated that the lace pattern effect 240 is generally caused by the pattern material 180 migrating up and away from the preparation surface 200 area to a degree. Likewise, some background material 170 settles on the preparation surface 200. This action creates an intricate or lace like effect referred to as the lace pattern effect 240 as generally depicted in FIG. 9.

It is further contemplated that the 1% to 2% silica thixotropic may be ¼% to 15%. And as discussed above, all amounts should be considered preferred embodiments and the invention is not limited to the same or near same amounts.

Whereas, the present invention has been described in relation to the drawings attached hereto, it should be understood that other and further modifications, apart from those shown or suggested herein, may be made within the spirit and scope of this invention.

Changes may be made in the construction and the operation of various components, elements and assemblies described herein or in the steps or the sequence of steps of the methods described herein without departing from the spirit and scope of the invention as defined in the following claims.

What is claimed is:

1. A method of preparing a synthetic solid surface material having partial lines and dots in a spider's web pattern comprising the steps of:
   a. preparing a background material having resin;
   b. preparing a pattern material having resin wherein said pattern material is a visually differentiable color than said background material and wherein said pattern material has a specific gravity weight less than said background material;
   c. providing a mold having a preparation surface;
   d. applying said pattern material across said preparation surface in a spider web pattern made of lines, partial lines, and dots;
   e. applying said background material over said pattern material and said preparation surface not covered by said pattern material;
   f. allowing said pattern material to rise through said background material wherein a mixture is formed by vibrating said mold;
   g. curing said mixture into solid surface; and
   h. removing said solid surface from said mold.

2. The method of claim 1 wherein said step of curing said mixture further includes the step of curing said mixture at a room temperature of about 150-180 degrees Fahrenheit.

3. The method of claim 2 wherein said step of curing said mixture at a room temperature of about 150-180 degrees Fahrenheit further includes said curing for a time of about 1 to 2 hours.

4. The method of claim 1 which further includes sanding said solid surface to a desired thickness and smoothness.

5. The method of claim 1 wherein said pattern material comprises polyester resin, silica thixotropic, aluminum trihydrate filler, catalyst methyl ethyl ketone peroxide, and pigment.

6. The method of claim 5 wherein said background material comprises polyester resin, aluminum trihydrate filler, iron oxide pigments, and methyl ethyl ketone peroxide organic peroxide type D.

7. A method of preparing a synthetic solid surface material having pattern comprising the steps of:
   a. preparing a background material having polyester resin, aluminum trihydrate filler, iron oxide pigments, and methyl ethyl ketone peroxide organic peroxide type D;
   b. preparing a pattern material having polyester resin, silica thixotropic, ATH filler, catalyst methyl ethyl ketone peroxide, and pigment wherein said pattern material is a visually differentiable color than said background material and wherein said pattern material has a specific gravity weight less than said background material;
   c. providing a mold having a preparation surface;
   d. applying said pattern material across said preparation surface in a spider web pattern made of lines, partial lines, and dots;
   e. applying said background material over said pattern material and said preparation surface not covered by said pattern material;
   f. allowing said pattern material to rise through said background material wherein a mixture is formed;
   g. curing said mixture into solid surface; and
   h. removing said solid surface from said mold.

8. The method of claim 1 wherein the step of allowing said pattern material to rise through said background material wherein a mixture is formed further includes vibrating said mold.

9. The method of claim 1 wherein said step of curing said mixture further includes the step of curing said mixture at a room temperature of about 150-180 degrees Fahrenheit.

10. The method of claim 2 wherein said step of curing said mixture at a room temperature of about 150-180 degrees Fahrenheit further includes said curing for a time of about 1 to 2 hours.

11. The method of claim 1 which further includes sanding said solid surface to a desired thickness and smoothness.

* * * * *